(12) United States Patent
Vadivelu et al.

(10) Patent No.: US 9,092,367 B2
(45) Date of Patent: Jul. 28, 2015

(54) CONFIGURING A REMOTE M-PHY

(75) Inventors: Karthi R. Vadivelu, Folsom, CA (US); Sridharan Ranganathan, San Ramon, CA (US); Anoop Mukker, Folsom, CA (US); Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,812

(22) PCT Filed: May 2, 2012

(86) PCT No.: PCT/US2012/036176
§ 371 (c)(1),
(2), (4) Date: Jun. 27, 2013

(87) PCT Pub. No.: WO2013/165416
PCT Pub. Date: Nov. 7, 2013

(65) Prior Publication Data
US 2013/0297833 A1    Nov. 7, 2013

(51) Int. Cl.
*G06F 3/00* (2006.01)
*G06F 13/12* (2006.01)
*G06F 5/00* (2006.01)

(52) U.S. Cl.
CPC ........... *G06F 13/126* (2013.01); *Y02B 60/1228* (2013.01)

(58) Field of Classification Search
None
See application file for complete search history.

(56) References Cited

U.S. PATENT DOCUMENTS

| | | |
|---|---|---|
| 2007/0115956 A1* | 5/2007 | Beshai et al. ............... 370/369 |
| 2010/0275037 A1 | 10/2010 | Lee et al. |
| 2011/0161530 A1 | 6/2011 | Pietri et al. |
| 2012/0017016 A1 | 1/2012 | Ma et al. |
| 2012/0066417 A1 | 3/2012 | Foster |

FOREIGN PATENT DOCUMENTS

TW          201135472 A1    10/2010

OTHER PUBLICATIONS

International Search Report and Written Opinion received for PCT Patent Application No. PCT/US2012/036176, mailed on Jan. 21, 2013, 14 pages.
Preliminary Report of Patentability issued by WIPO on Nov. 13, 2014 for PCT Patent Application No. PCT/US2012/036176 (6 pages).
Taiwan Office Action issued by Taiwan Patent Office as completed on Mar. 25, 2015 for Taiwan Invention Patent Application No. 102115272 (10 pages).

* cited by examiner

*Primary Examiner* — Scott Sun
(74) *Attorney, Agent, or Firm* — International IP Law Group, P.L.L.C.

(57) ABSTRACT

An interface for low power, high bandwidth communications between units in a device in provided herein. The interface comprises a USB 3.0 system interface and a SuperSpeed inter-chip (SSIC) protocol adaptor configured to facilitate communications between the USB 3.0 system interface and an M-PHY interface, wherein the SSIC is configured to issue remote register access protocol (RRAP) commands through a local M-PHY to a remote M-PHY in a low speed burst mode.

7 Claims, 8 Drawing Sheets

CONFIGURING A REMOTE M-PHY

TECHNICAL FIELD

The present invention relates to the use of inter-chip communications in devices using the SuperSpeed inter-chip (SSIC) specification.

BACKGROUND ART

Mobile computing and communications platforms, such as smartphones and tablets, often consist of an application processor system-on-a-chip (SoC) and other hardware devices such as a cellular modem, wireless networking (WiFi) devices, and NAND storage devices. Communications between these hardware components require the definition of an interface, hardware components, such as a controller, to implement the interface, and an associated software stack to control the communication. The development of the required hardware and software components and the subsequent tuning to ensure the implementation is power and performance optimal is a resource intensive exercise that requires resources and can impact the time to market of the solutions. Currently inter-chip communications are handled by a High Speed Inter-Chip interface inside the platform to communicate with devices. However this interface is limited to 480 Mbps and does not provide bandwidth scalability. As used herein, inter-chip indicates communications inside the device, which may be between chips or internal circuit boards.

The universal serial bus (USB) is a ubiquitous peripheral-interconnect of choice for a large number of computing and consumer applications. Many systems provide a comprehensive set of software drivers to support commonly available USB peripherals. Further, there is an existing USB ecosystem that includes USB silicon suppliers, design houses, and verification and testing vendors that lower the cost of implementation for product manufacturers of USB hosts and peripherals. The USB 3.0 specification adds support for transfer speeds of 5 Gbps to address the need for higher bandwidth. However, the use of USB 3.0 specification requires that remote devices be programmed from a local host.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Current USB 3.0 specifications provide for high speed interfacing, e.g., up to about 5 GB or higher, with external devices. However, the standard USB 3.0 SuperSpeed interfaces cannot be used inside mobile platforms for always-connected devices because of the high power consumption of the SuperSpeed physical layer (PHY). For example, as the SuperSpeed PHYs are designed to drive cables of about three meters in length, the power requirements are much higher than needed for inter-chip communications within a device. Further, the drivers used for interfacing with external devices do not tune the communications frequency to avoid EMI problems with other devices, such as internal radio modems used with mobile providers for wireless wide area network (WWAN) communications. To address this need, embodiments described herein implement a Super Speed Inter-Chip (SSIC) interface as an optimized inter-chip version of USB 3.0.

The SSIC interface combines the robust software support for the SuperSpeed protocol with a low-power Mobile Industry Processor Interface (MIPI) Physical Layer (M-PHY) to provide an interface that can be used in mobile platforms with minimal resource investment. Unlike standard SuperSpeed, which is often fixed at 5 Gbps, SSIC provides scalable bandwidth starting as low as 1.25 Gbps to reduce the power consumption of the interface. The SSIC uses the MIPI M-PHY specification as the physical layer of the link to meet the requirements of embedded inter-chip interfaces. The MIPI M-PHY specification describes a serial physical layer technology with high bandwidth capabilities, which is specifically developed for mobile applications to obtain low pin count combined with very good power efficiency.

However, the M-PHY specification was developed assuming that new operating and access software would be developed to replace current software interfaces. The SSIC protocol adaptor described in embodiments herein functions as an intermediate unit between a standard USB 3.0 SuperSpeed media access controller (MAC) and an M-PHY unit, translating responses between each of the connected units, and providing high speed communications while allowing reuse of current technologies.

The SSIC interface allows for the SSIC protocol adaptor, or the host controller, to configure a device state on the remote side of the link as part of the link configuration process. Specifically the SSIC spec defines Remote Register Access Protocol (RRAP) Read and Write commands that can be sent in a low speed burst communications mode using pulse width modulation (PWM) to an M-PHY, to enable the device configuration to be performed. Examples of states that may be configured include, but are not limited to, local M-PHY settings, remote M-PHY settings, remote fuse configurations, and boot loader code for the device and run-time firmware. Remote fuse configurations are altered to enable or disable specific features in the remote device that may depend on the targeted platform usage or SKU. Boot code is required to be configured for devices in highly integrated mobile platforms that do not have dedicated flash memory storage for storing the code.

Some devices do not support state retention and require the host to re-configure the state each time the link is reset. As a result, an efficient mechanism for the host controller to implement the RRAP configuration mechanism can be beneficial to the performance and power of the system. Embodiments described herein provide a power optimized mechanism for the host to implement a Remote Register Access Configuration protocol.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
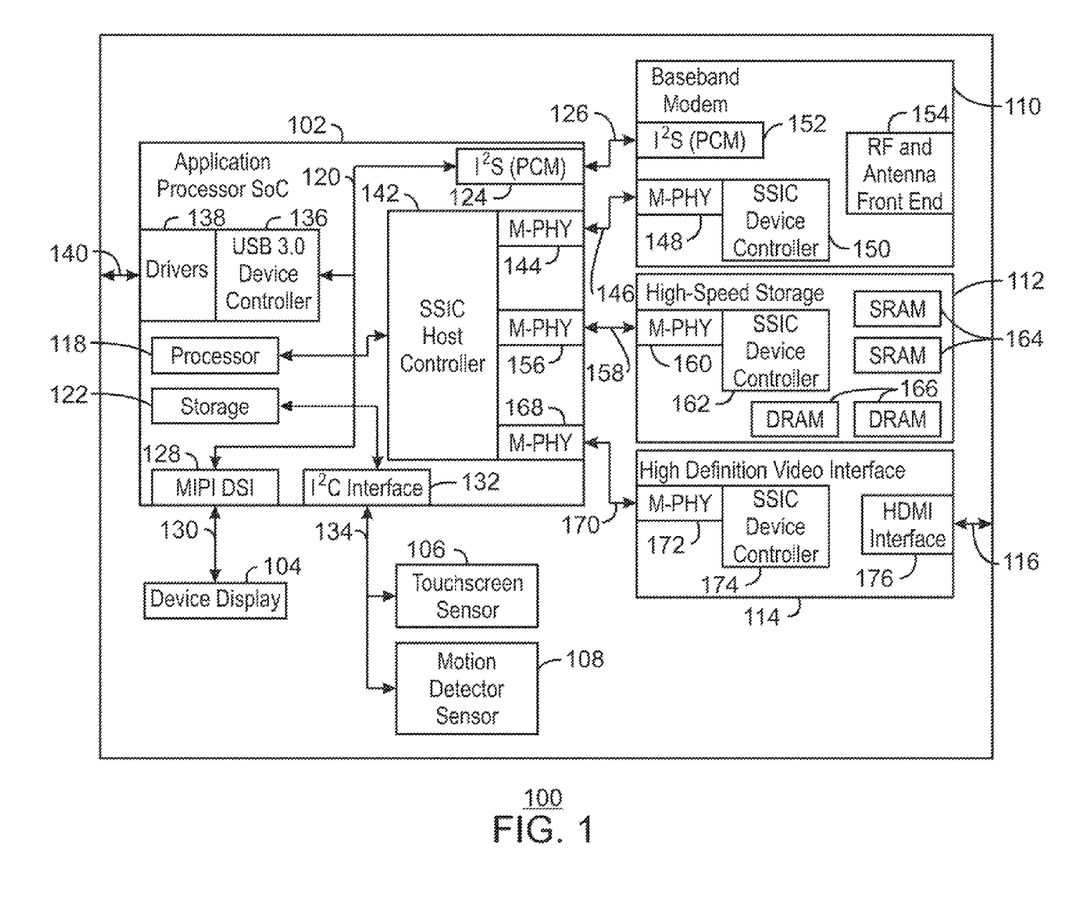
FIG. 1 is a block diagram of a computing system that may be used in accordance with embodiments.

FIG. 1 is a block diagram of a computing system 100 that may be used in accordance with embodiments. The computing system 100 may include a smartphone, a tablet, a laptop computer, a desktop computer, a server node, and the like. In the exemplary embodiment illustrated in FIG. 1, the computing device 100 includes a number of units or chips built into the device that can be used to implement a smartphone or tablet functionality.

For example, the computing device 100 can include a system on a chip (SoC) 102 that is used to implement the basic operations of the computing device 100. A display device 104 may be included to provide output from the SoC 102 to a user. A touchscreen sensor 106 and a motion sensor 108 can be used to provide user input to the computing device 100. A baseband modem 110 can be used to connect the computing device 100 to a wireless wide area network (WWAN), such as a mobile phone network. The computing device 100 may also include a high speed storage system 112 that can be used, for example, to store large amounts of data that needs to be transferred at a high bandwidth, such as video and audio files. As used herein, a video file includes both video and audio data, and may include high resolution video images, such as those at a non-interlaced resolution of 1920×1080 (under the 1080p specification). A high definition video interface 114 may be included to transfer video files to external devices through a cable connected to a port 116. It can be understood that not all of these units are present in all embodiments. Further, any number of other units may be included to add other functionality, such as an audio system to play audio files, and a wireless network adapter (WIFI) used to connect to wireless local area networks (WLANs), among others.

The SoC 102 may further include a processor 118 and a number of other systems that are coupled to the processor 118 by a SoC fabric 120, or bus. For example, the processor 118 may be coupled through the SoC fabric 120 to a storage system 122. The storage system 122 may include any combinations of dynamic ram (DRAM), static ram (SRAM), read only memory (ROM), and registers associated with the processor 118. The storage system 122 can be used to hold operational data and programs that, when executed by the processor 118, provide the basic functionality of the SoC 102, and, thus, the computing device 100. For example, the programs may include a phone functionality used to place voice calls to the WWAN over the baseband modem 110, for example, through an I²S interface 124 that encodes the voice signal using pulse code modulation (PCM). A PCM interface 126 can be used to exchange the PCM signals with the baseband modem 110.

The SoC 102 drives the device display 104 using a display driver, for example, a MIPI DSI 128 (mobile industry processor interface—display serial interface) coupled to the SoC fabric 120. The MIPI DSI 128 is coupled to the device display 104 through a high speed point-to-point serial bus 130 that includes a high speed clock lane and one or more data lanes. An I²C interface 132 can be included in the SoC fabric 120 to drive an I²C bus 134, which can be used to couple the touchscreen sensor 106 and the motion sensor 108 to the SoC 102.

The SoC 102 may include a USB 3.0 interface to provide a high speed interface, for example, up to 5 GB/s, with devices on an external USB 3.0 bus. The USB 3.0 interface may include a USB 3.0 device controller 136 coupled to the SoC fabric 120, and high power drivers 138 configured to drive a USB cable through a port 140 on the device.

In embodiments described herein, the SoC 102 may include a SuperSpeed Inter-Chip (SSIC) host controller 142 coupled to the SoC fabric 120. The SSIC host controller 142 is configured to allow communications between the SoC 102 and high speed devices located within the computing device 100. For example, these devices may include the baseband modem 110, the high speed storage system 112, and the high definition video interface 114, among others.

The SSIC Host controller 142 may be linked to multiple M-PHYs for interfacing to specific devices. For example, a first M-PHY 144 can drive a super speed serial interface 146 to an M-PHY 148 located within the baseband modem 110. The M-PHY 148 in the baseband modem 110 is coupled to an SSIC device controller 150, which is coupled to the fabric or bus of the baseband modem 110. The fabric of the baseband modem 110 may also contain an I²S interface 152 that can be coupled to the PCM interface 126 to accept PCM signals from the SoC 102. An RF and antenna front end 154 in the fabric of baseband modem 110 can be used to couple the computing device 100 to a WWAN for both voice and data communications. High speed data communications, such as the fourth generation (4G) mobile services may occur at substantial bandwidths, benefitting from the high speed communications through the SSIC interface with the SoC 102.

A second M-PHY 156 coupled to the SSIC host controller 142 in the SoC 102 can drive a super speed serial interface 158 to an M-PHY 160 located within the a high speed storage system 112. The M-PHY 160 is coupled to an SSIC device controller 162, which is coupled to the fabric or bus of the high speed storage system 112. The fabric of the high speed storage system 112 may also include any combinations of memory or storage devices, such as SRAMs 164 or DRAMs 166. As described, the high speed storage system 112 may be used to hold large files that require high bandwidth for adequate playback, such as high definition video files. Accordingly, the high speed storage system 112 may benefit from the SSIC interface to the SoC 102. Further, the serial interface 158 to the high speed storage system 112 may be formed from multiple lanes, wherein each lane includes paired transmitting and receiving lines. Each lane may, for example, be supported by a single set of M-PHYs at the device and the host, and thus, a multi-lane approach may include grouping multiple M-PHYs to increase the bandwidth.

Another M-PHY 168 coupled to the host controller 142 in the SoC 102 can drive a serial interface 170 to a M-PHY 172 located within the high definition video interface 114. The M-PHY 172 is coupled to an SSIC device controller 174, which is coupled to the fabric or bus of the high definition video interface 114. The fabric of the high definition video interface 114 can include, for example, a high definition multimedia interface (HDMI) 176 used to drive a television, or other device, through a cable connected to the port 116. As for the high speed storage system 112, the bandwidth requirements for video files may benefit from the SSIC. Further, a multi-lane approach that combines multiple M-PHYs may also be used to increase the bandwidth of the communications to the high definition video interface 114.

Each of the SSIC controllers described above may use a similar structure, allowing reuse of hardware and software modules. Further, in embodiments described herein, a Remote Register Access Protocol (RRAP) is implemented, for example, in an intermediate interface, or bridge, between current high speed MACs and M-PHYs. This allows for efficient programming of M-PHYs in remote devices, such as M-PHY 148, 160, or 172, from their respective M-PHY 144, 156, or 168 coupled to the SSIC host controller 142. As described herein, the bridge is termed a SSIC protocol adaptor, and is discussed further with respect to FIG. 2.

Figure 2:
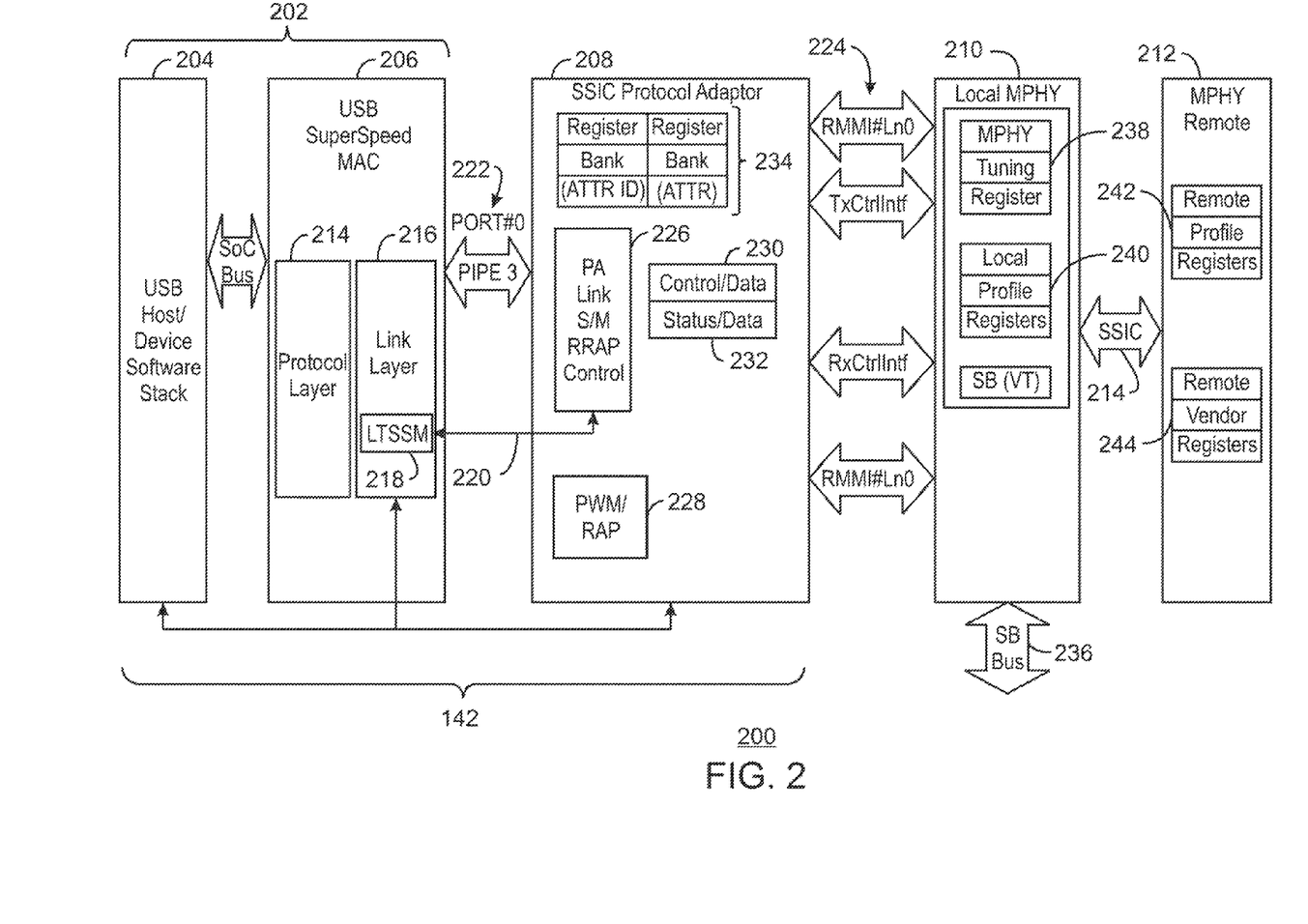
FIG. 2 is a block diagram of a SSIC (SuperSpeed Inter-Chip) implementation accordance with embodiments.

FIG. 2 is a block diagram of a SSIC (SuperSpeed Inter-Chip) implementation 200 accordance with embodiments.

Referring also to FIG. 1, the SSIC implementation 200 can be used to provide the SSIC communications link between the SoC 102 and the other devices, such as the baseband modem 110, the high speed storage 112, or the high definition video 114. In either host or device implementations, the SSIC implementation 200 includes a control stack 202 that includes a USB software stack 204 and a USB 3.0 SuperSpeed media access control (MAC) 206. As described herein, a bridge layer, termed a SSIC protocol adaptor 208, is included in the SSIC implementation 200 to provide an interface between the controller stack 202 and a MIPI M-PHY 210. As an example, the USB software stack 204, USB 3.0 SuperSpeed MAC 206, and the SSIC protocol adaptor 208 can form the SSIC host controller 142 described with respect to FIG. 1. A remote M-PHY 212 can exist in a device, and is coupled to the local M-PHY 210 over an SSIC link 214. In embodiments described herein, registers in the remote M-PHY 212 can be programmed over the SSIC link 214 to establish communications.

The USB 3.0 SuperSpeed MAC 206 is capable of operation at different link speeds as defined by the SSIC specification, for example, by a high speed gear and rate. The USB software stack 204 does not change from a standard USB 3.0 Super-Speed for the SSIC implementation 200. In the USB 3.0 SuperSpeed MAC 206, a protocol layer 214 also has no change in the SSIC implementation 200. The link layer 216 in the USB 3.0 SuperSpeed MAC 206 may have some changes for the SSIC implementation 200, which are defined in the SSIC specification. For example, a Link Training and Status State Machine (LTSSM) 218 may be reconfigured to have bidirectional communications, such as a handshaking line 220 to stay in synchronization with the SSIC protocol adaptor 208. To track the link states, and control the communications, the USB 2.0 SuperSpeed MAC 206 communicates state information from the LTSSM 218 and data packets with the SSIC protocol adaptor 208 through a PIPE3 interface 222.

The SSIC protocol adaptor 208 implements the specific communications between the PIPE3 interface 222 of the USB 3.0 SuperSpeed MAC 206 and the Reference M-PHY MOD-ULE Interface (RMMI) 224 of the M-PHY 210. The SSIC protocol adaptor 208 implements mechanisms to allow the USB 3.0 SuperSpeed MAC 206, and the USB software stack 204, to operate as if they were connected to a USB 3.0 Super-Speed link, for example by tracking the LTSSM 218 and providing the expected responses on the link.

To perform these functions, the SSIC protocol adaptor 208 communicates the USB 3.0 packets from the PIPE3 interface 222 to the M-PHY 210 through the RMMI 224 and maps the SuperSpeed power states for SSIC. A single PIPE3 interface 222 can be interfaced to multiple RMMIs 224, to provide multilane communications, as shown in FIG. 1. For example, multiple M-PHYs 144, 156, and 168 may be used with a single SSIC host controller 142. Further, the SSIC protocol adaptor 208 handles the transmit Scrambler and receive Descrambler as described in the SSIC specification.

The PA LINK SM (physical adaptor link state machine) 226 represents the main state machine for the SSIC protocol adaptor 208 and may be a ladder logic unit, a processor, and the like. The PA LINK SM 226 converges the MIPI M-TX and M-RX data and power states to create the data and power states for the PIPE3 interface 222. The PA LINK SM 226 also handles the high level controls for various modes of operation and speed. For example, the PA LINK SM 226 may directly control the RRAP programming of registers in the remote M-PHY 212 or may trigger the programming by a separate unit termed the PWM/RRAP (pulse width modulation/remote register access protocol) controller 228. In some embodiments, the PWM/RAP controller 228 may be located in the application processor SoC, e.g., SoC 102 in FIG. 1, and linked to the SoC fabric 120. In other embodiments, the PWM/RAP controller 228 may be located in the USB SuperSpeed MAC 206.

The receiver detection and LFPS reception (low frequency periodic signal) is supported as defined in the specification for the PIPE3 interface 222. The warm reset, link connect, and link disconnect are all implemented in the PA LINK SM 226. The USB 3.0 SuperSpeed LTSSM state is tracked to translate the PIPE3 power and data state to RMMI power and data state, allowing the USB 3.0 SuperSpeed MAC to function as if connect to a normal USB 3.0 SuperSpeed link.

The PWM/RRAP controller 228 implements pulse width modulation (PWM) low speed (LS) burst communications and Remote Register Access Protocol (RRAP) support. In some embodiments, the PWM/RRAP controller 228 may be implemented as functionality within the PA link S/M 226. The RRAP may be used to program registers in the local M-PHY 210 or the remote M-PHY 212. During RXDETECT.LS-MODE, when the link is configured for automatic profile programming, the PWM/RRAP 226 accepts access commands from the PA link S/M 226. When configured for non-automatic mode, software is involved and this block accepts access commands from software or firmware. The RRAP programming process described herein is not limited to implementation in the SSIC protocol adaptor 208, but may be implemented in the USB SuperSpeed MAC 206, or even in the host itself.

To implement the RRAP functions, a number of registers and buffers may be located in the SSIC protocol adaptor 208. These registers form the RRAP Host Controller Programming Interface (RRAP HOPI). For example, a control register 230 that is used by the PWM/RRAP controller 228 to setup individual transfers and provide the data to be transmitted for writes. A status register 232 may be used to store data returned from Reads, as well as return the status of transactions to the PWM/RRAP controller 228 controller after each read or write operation. The status register 232 is used to report the status of Write or Read Local and Remote transactions. The data field contains the result of a read operation or stores information that may be used in a write operation. The status field contains the status of the operation.

A register bank 234 can be used to store a set of RRAP transactions that can be executed as a batch. The register bank 234 is used to set up Write operations, for example, to the Remote M-PHY 212, which can be executed automatically by the host controller after every Line Reset. For example, the register bank 234 stores the number and order of transactions (commands) to be issued. It also stores configuration data for the writes and completion data for the reads. The SSIC protocol adaptor 208, or the USB SuperSpeed MAC 206, may implement a RRAP Save-Restore Logic to save the contents of the register bank 234 to the system memory, for example, storage 122 of FIG. 1, and restore the register bank 234 from the system memory. Accordingly, a range of memory addresses may be reserved in the system memory that is large enough to store the contents of the register bank.

The local M-PHY 210 is the physical layer for the SSIC link 214, and is compliant to the MIPI M-PHY specifications. The local M-PHY 210 implements the high bandwidth serial physical layer at different high-speed (HS) gears and rates. It also supports bit or PWM scheme at gear 1 (low speed) for programming the profile registers in the remote M-PHY 212, as described herein. The local M-PHY 210 interfaces with the SSIC protocol adaptor 208 via the RMMI interface 224.

In most implementations, a sideband (SB) bus 236 is present to program the registers in the local M-PHY 210, although these registers could also be programmed from the SSIC protocol adaptor 208 using the RRAP. The sideband bus 236 is coupled to the fabric of the SoC by a port, allowing direct access to the M-PHY registers. The registers in the local M-PHY 210 that may be programmed include M-PHY tuning registers 238 that adjust parameters such as the slew rate, i.e., the speed of transitions on communications lines, and other electrical parameters of the SSIC link 214. A bank of local profile registers 240 hold general communications parameters, such as the current communications speed, among others.

The remote M-PHY 212 can be located in a coupled device. The remote M-PHY 212 has registers that can be used to control the link in an analogous manner to those in the local M-PHY 210. For example, a bank of remote profile registers 242 can hold communications parameters. A bank of remote vendor registers 244 can hold operating information for the remote M-PHY 212. In an embodiment, the remote profile registers 242 and remote vendor registers 244 can be programmed over the SSIC link 214 by the SSIC protocol adaptor 208 using RRAP. The registers that can be programmed in the remote M-PHY 212 are not limited to those discussed, but can include other registers, such as M-PHY tuning registers.

Establishing Communications

The SSIC protocol adaptor 208 establishes and maintains communications between the USB SuperSpeed MAC 206 and the local M-PHY 210, for example, by mapping expected states and transitions between a MAC and an M-PHY as shown in Table 1. Thus, the functionality of the local M-PHY 210 is generally not visible to the USB SuperSpeed MAC 206, outside of handshaking lines, and the USB SuperSpeed MAC 206 performs as if connected to a standard high speed USB 3.0 PHY (physical layer). To the software at the operating system level and higher, the link generally appears to be a standard USB 3.0.

The process for establishing communications begins at state 1, in which the link training and status state machine (LTSSM 218) in the USB SuperSpeed MAC 206 is in a SuperSpeed disabled state (SS.DISABLED). At this point, the local M-PHY 210 is also powered down (Unpowered/Disable). The link is in this state when the link is not powered, or if a local reset has been asserted. When the LTSSM 218 transitions to a more active state, for example, by deasserting a local reset, the USB SuperSpeed MAC 206 transitions as shown in state 2, from SS.DISABLED to RX.DETECT. The SSIC protocol adaptor 208 can then transition the local M-PHY 210 from disabled to HIBERN8.

The SSIC protocol adaptor 208 does not take action on RX.DETECT commands (state 3) issued by the LTSSM 218 of the USB SuperSpeed MAC 206, but returns a "no device detected" response to keep the MAC holding for a link. Meanwhile, the SSIC protocol adaptor 208 uses the local M-PHY 210 detection mechanisms to determine if any other devices are coupled to the link. Specifically, the M-PHY transmitter (Tx) sends a zero signal, termed DIFF N (or DIF N) to trigger activation of coupled devices (Tactivate), while the M-PHY receiver looks for DIFF N to trigger receiving (Tactivation).

Once the local M-PHY 210 detects activation, e.g., by a remote M-PHY 212, the link system may enter state 4. This occurs when MPHY Tx has completed sending DIFF-N for Tactivate and MPHY Rx has received a corresponding DIFF-N signal. In embodiments, once the local M-PHY 210 has detected an SSIC link 214 to a remote M-PHY 212, the SSIC protocol adaptor 208 can program registers in the local M-PHY 210 and the remote M-PHY 212, for example, using the RRAP process described with respect to FIGS. 3-7.

After the registers are programmed, the SSIC protocol adaptor 208 then brings the local M-PHY 210 into a high-speed (HS) state, in which it is ready to send training symbols. Training symbols are a set of data patterns that are used by the receiver to establish the high speed link with a transmitter. After training is complete, the SSIC protocol adapter 208 sends the USB SuperSpeed MAC 206 a signal that a device is coupled to the link, changing the state from RX.DETECT to POLLING. The state of the M-PHY is changed from HIBERN8 to STALL to await data packets from the MAC.

TABLE 1

Mapping of MAC LTSSM to M-PHY by SSIC protocol adaptor

| State (Transition) | SS LTSSM | M-PHY Tx & Rx |
|---|---|---|
| 1 | SS.DISABLED | Unpowered/Disabled |
| 2 | SS.DISABLED -> RX.DETECT | Disabled -> HIBERN8 |
| 3 | RX.DETECT.* | HIBERN8 |
| 4 | RX.DETECT -> POLLING | HIBERN8-> STALL |
| 5 | POLLING.X | STALL |
| 6 | POLLING.X -> U0 | STALL -> HS-BURST |
| 7 | U0 | HS-BURST (<-> STALL) |
| 8 | U0-> U3 | HS-BURST -> (STALL) -> HIBERN8 |
| 9 | U3 | HIBERN8 |
| 10 | U3-> U0 | HIBERN8-> (STALL) -> HS-BURST |

At this point, communications is established between the devices, and high speed data packets are transferred. To the system, a normal USB 3.0 high speed communications link has been established between the host and device. The SSIC protocol adaptor 208 is passing data between the USB SuperSpeed MAC 206 and the local M-PHY 210 to be sent on through the SSIC link 214 to the remote M-PHY 212. The system software in the USB software stack 204 can then determine the device type and load the appropriate driver, for example, from system memory or from the device itself. Communications are occurring in HS BURST mode through the SSIC protocol adaptor.

If a data pause is desired, for example, there is a period where no data is sent, the SSIC protocol adaptor 208 can drive the local M-PHY 210 into a STALL mode, as shown in state 5. STALL is an opportunistic state that conserves power during the M-PHY communications, and is invisible to higher levels. For example, during STALL of the local M-PHY 210, the USB SuperSpeed MAC 206 continues looking for data transfers by remaining in POLLING mode. Either end of the SSIC link 214 can go into STALL mode, for example, the SSIC protocol adaptor 208 drives the M-PHY Tx to drive DIFF N onto the link to bring Tx in STALL, or receives a DIFF N from the remote M-PHY 212 that takes M-PHY Rx to STALL.

Once data is available for sending or receiving, as indicated by a series of signals exchanged between the M-PHYs 210 and 212, in state 6, the SSIC protocol adaptor 208 changes the status of the local M-PHY 210 from STALL back to HS-BURST, and signals the USB SuperSpeed MAC 206 that the status can be changed from POLLING to U0 (normal communications). In this implementation, again, neither the local M-PHY 210 nor the USB SuperSpeed MAC 206 are aware of the other, as each is receiving the expected signals provided by the SSIC protocol adaptor 208. This state carries over to state 7, in which the USB SuperSpeed MAC 206 assumes that normal communications are occurring (U0) and the M-PHYs 210 and 212 are moving back and forth between HS BURST and STALL as data is available on the SSIC link 214. Shorter pauses in data transmission can be made during the communications by the SSIC protocol adaptor 208 having the MPHY-TX insert filler symbols or logical idle (LI) symbols, while the MPHY-Rx removes these symbols accordingly. The transitions in these states are transparent to the USB SuperSpeed MAC 206.

During the POLLING state, data sent may only be used to train the link between the M-PHYs 210 and 212 and to configure the devices. In contrast, the U0 state is actual communications state. During U0, actual data communications is taking place, including device configuration, the loading of drivers, and the exchange of substantive data.

If data amounts should drop, such as if communications are temporarily ended between device and host, the SSIC protocol adaptor 208 may accept a signal indicating that the USB SuperSpeed MAC 206 is switching from U0 to a U3 (communications paused) state, as shown in state 8. U0 to U3 transition happens when the system software has no further data to send through the USB SuperSpeed MAC 206. The SSIC protocol adaptor 208 can then switch the local M-PHY 210 from HS-BURST to STALL, and then to HIBERN8. As shown in state 9, the USB SuperSpeed MAC 206 can remain in U3, and the local M-PHY 210 in HIBERN8, for as long as there is no further data to be sent between the devices.

Once there is need for communications to be resumed, as shown in state 10, the USB SuperSpeed MAC 206 can switch indicate that the state is preparing to go from U3 to U0, and the SSIC protocol adaptor 208 can reestablish communications, for example, by reprogramming the remote M-PHY 212 registers, if needed, using PWM communications and the RRAP. In this case, the USB SuperSpeed MAC 206 sends packets for retraining the link, which are essentially ignored by the SSIC protocol adaptor 208. The SSIC protocol adaptor 208 uses the local M-PHY 210 to retrain the SSIC link 214, then switches the local M-PHY 210 from HIBERN8 to STALL, and finally to HS-BURST. At that point, the SSIC protocol adaptor 208 can inform the USB SuperSpeed MAC 206 that communications have been established, and the state can change from U3 to U0. Once communications are established, the packet stream can be communicated between the devices as described with respect to FIG. 3.

Figure 3:
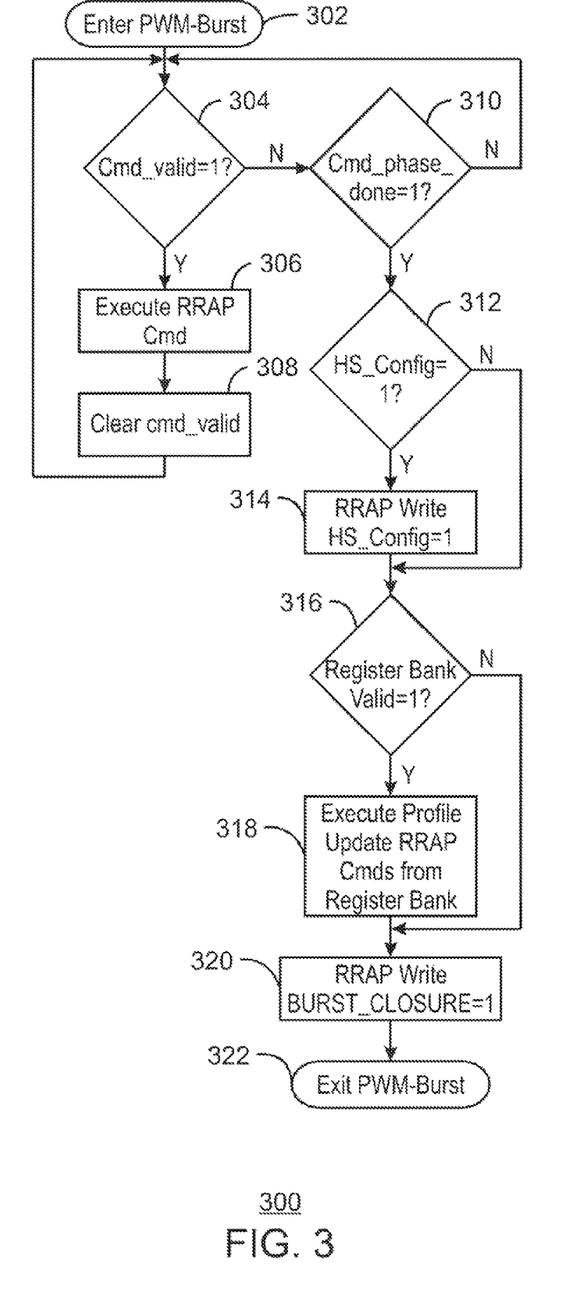
FIG. 3 is a flow chart of a method for programming an M-PHY using RRAP.

FIG. 3 is a flow chart of a method 300 for programming an M-PHY using RRAP. Referring also to FIG. 2, software, for example, located in the SSIC protocol adaptor 208, can use a Register Access Control mechanism to access registers in the local M-PHY 210, using RMMI 224 configuration accesses. The software may access registers in the remote M-PHY 212 using PWM G1 cycles on the RMMI 224 to the local M-PHY 210. The RRAP programming technique can be used to access registers in the local M-PHY 210, but this technique is slower and more cumbersome than accessing the registers using the SB bus 236. The SSIC protocol adaptor 208 accepts commands through the control register 230 only when the link is the PWM Burst state. Accordingly, the method 300 begins at block 302, when communications enter a low speed burst (LS-BURST) mode that uses pulse width modulation (PWM) for the communications over the SSIC link 214.

The control register 230 holds the bits used to setup and control the transactions. Software in the host, termed an RRAP controller herein, programs the register banks 230 or the data section of the status register with the address or Attribute ID, Data byte, Read/Write, and the target, e.g., remote or local. The RRAP controller can set control bits to determine data flow and triggers the programming process.

For example, a command valid (cmd_valid) bit, or flag, in the control register 230 is then set to indicate that a valid command is present, for example, in the status register 232. At block 304, the command bit is checked to see if a valid command is present. If so, flow proceeds to block 306. At block 306, the RRAP command is executed from the status register 232. After execution of the command, at block 308, the command valid bit is cleared, and flow returns to block 304 to check for another valid command from the RRAP controller.

If the command valid bit is not true at block 304, process flow proceeds to block 310 to determine if the command phase is completed. A Command Phase Done (cmd_phase_done) flag indicates that there are no more commands. If this flag is not true, flow returns to block 304 to continue looking for valid commands from the RRAP controller, for example, by checking the cmd_valid flag in the control register 230.

If the cmd_phase_done flag is true (1), process flow proceeds to block 312 to determine if a request for a high speed configuration has been made by checking the HS_Config flag. If the HS_Config flag is true (1), an RRAP write of a configuration command is performed at block 314 and process flow proceeds to block 316. If the HS_Config flag is not true (0), process flow jumps block 314 to resume at block 316.

At block 316 a flag checked to determine if the register bank 234 contains valid RRAP command data, indicated by a value of one for the Register Bank Valid flag. If the register bank contains valid data, at block 318, the block of RRAP commands in the register bank 234 are executed. Once an invalid entry is reached in the register bank 234 or the end of the register bank 234 is reached, the SSIC protocol adaptor 208 interprets this as the end of the PWM burst phase and executes the Burst Closure RRAP command, at block 320. After executing the Burst Closure RRAP command the SSIC protocol adaptor 208 exits the PWM Burst link state at block 322. More specifically, if the Register Bank Valid is set to '0', the SSIC protocol adaptor 208 treats this as end of PWM Burst and immediately issues the Burst Closure command and exits PWM Burst Link state.

The sequence described above may be executed by the SSIC protocol adaptor 208 upon each entry into the PWM Burst state (for instance after a Line Reset). In subsequent iterations, the SSIC protocol adaptor 208 will typical see the cmd_valid flag set to false (0) and the cmd_phase_done flag set to true (1). This will cause the SSIC protocol adaptor 208 to automatically perform any cycles required by the HS_Config flag, execute the contents of the Register bank 234 (if register bank valid is true), and automatically perform burst closure.

The method 300 defined above may be executed in a number of different sequences to implement particular functionality. The control of these sequences is determined by setting the flags in the control register 230 prior to starting the execution. For example, the SSIC protocol adaptor 208 can run in fully automatic mode, a programmed I/O mode, and a batch configuration mode, among others.

Figure 4:
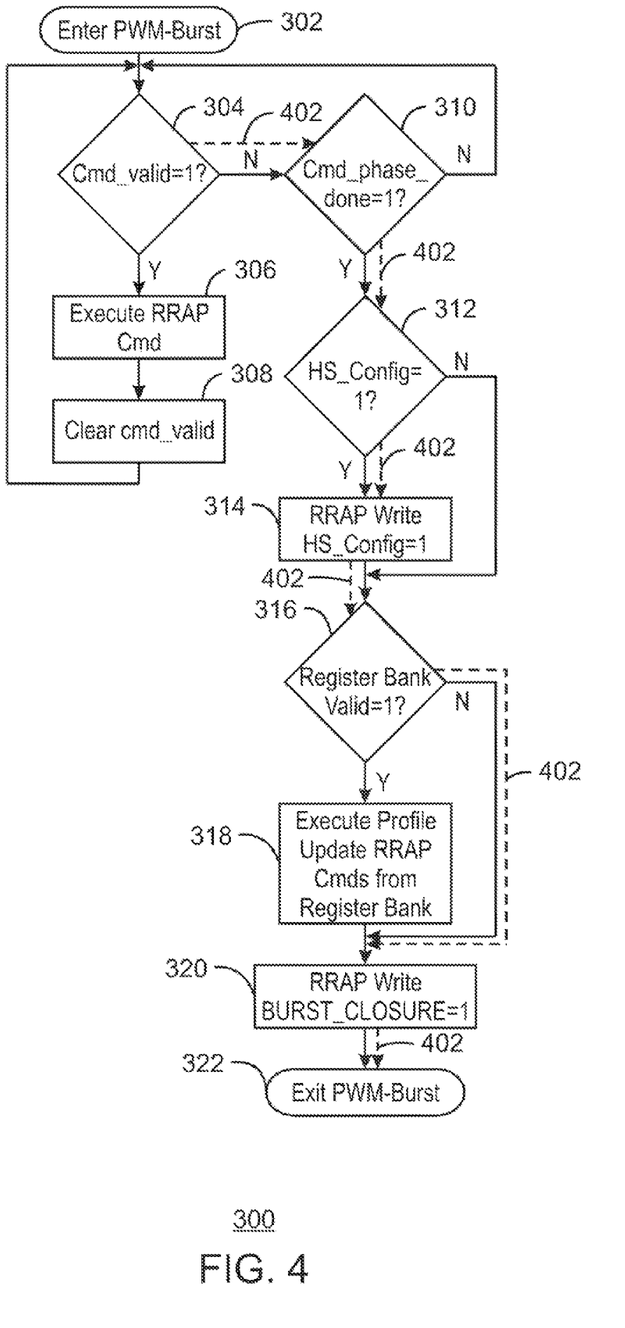
FIG. 4 is a flow chart of the method for programming remote registers using a RRAP control in Full Auto mode.

FIG. 4 is a flow chart of the method 300 for programming remote registers using a RRAP control in Full Auto mode. Like numbered items are as discussed with respect to FIG. 3. Full auto mode is used when no remote configuration needs to be performed by the RRAP controller. The mode allows for exiting the automated RRAP mode exit without the involvement of system firmware running on the external RRAP controller. The flow is possible during initial training and can be used to implement a re-train following a line reset or disconnect. To run full auto mode, the cmd_valid flag is set to false (0), the cmd_phase_done flag is set to true (1), the HS_Config flag is set to true (1), and the register bank valid flag is set to false (0). As a result of the flags being set to the values mentioned above, process flow follows the path shown in FIG. 4 as dotted line 402.

Figure 5:
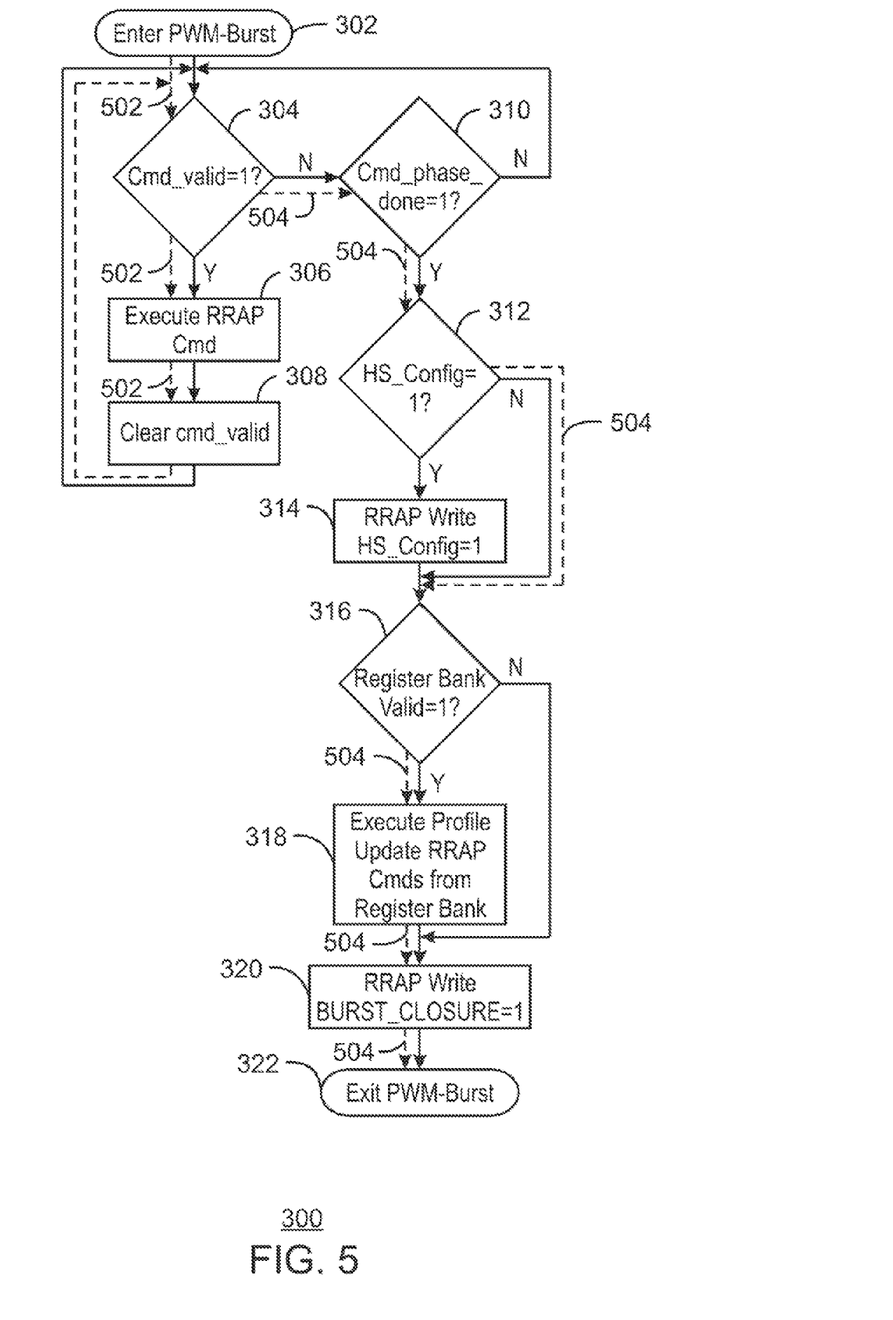
FIG. 5 is a flow chart of the method for programming remote registers using a RRAP control in a Programmed I/O Mode.

FIG. 5 is a flow chart of the method 300 for programming remote registers using a RRAP control in a Programmed I/O Mode. Like numbered items are as discussed with respect to FIG. 3. In the case the link is reset during normal operation, the software or firmware on the RRAP controller needs to participate in the process of reconfiguring the link.

The flow through the method 300 begins as shown by dotted line 502 in FIG. 5. The mode requires the RRAP controller to initiate each remote access (read or write) cycle using the "control" register and wait for the status of each cycle in the "status" register before initiating the next access. This flow is performed by setting the cmd_valid flag to true (1), the cmd_phase_done flag to false (0), the HS_Config flag to false (0), and the register bank valid flag to true (1), prior to initiating the programming process.

The method 300 then iterates through blocks 306 and 308 until all RRAP commands have been performed, for example, by firmware or software that is controlling the link. After all RRAP commands have been executed, the cmd_phase_done flag is set to true (1), allowing process flow to proceed to block 312, following dotted line 504. Block 316 is skipped, as the high speed configuration has been performed through the commands, or will be performed through commands from the register bank. Flow then proceeds through blocks 318, 320, and 322 to finish the programming and place the link on line. This flow is possible only during initial training of the link, since it requires the firmware or software to sequentially perform the individual commands.

Figure 6:
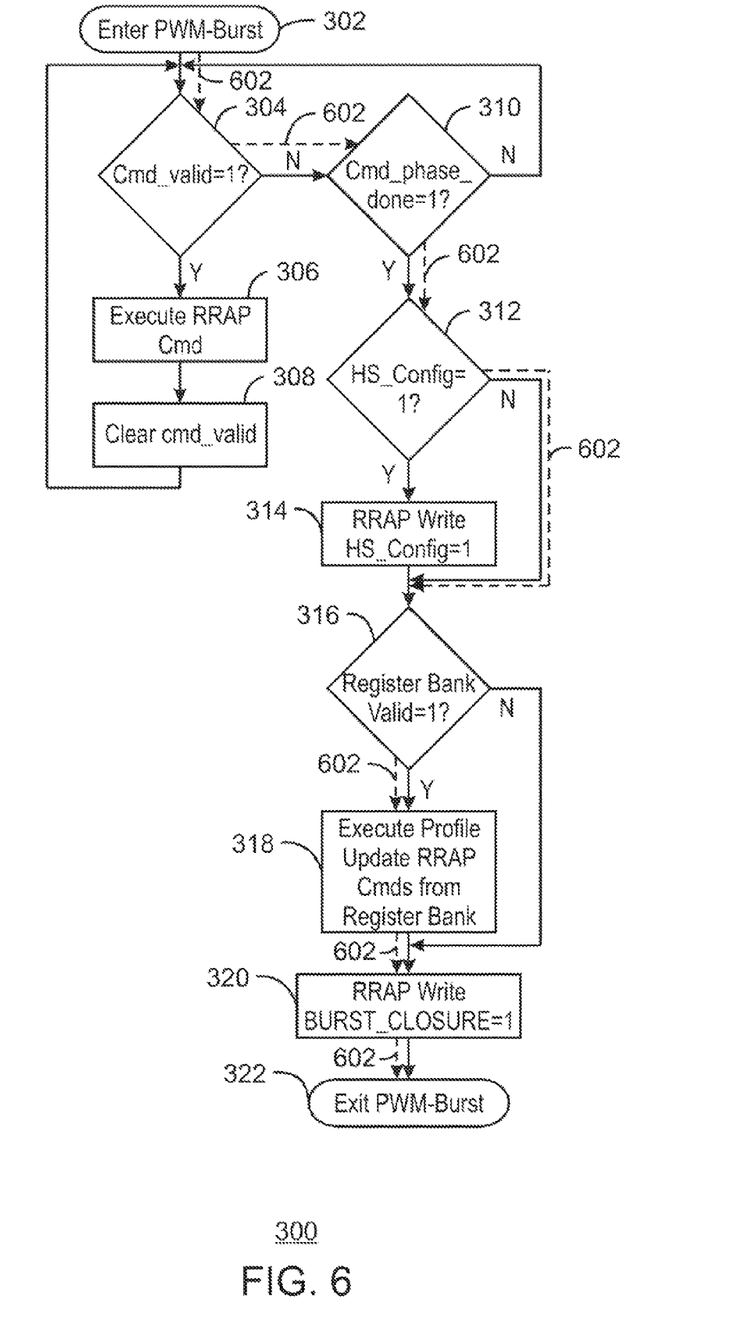
FIG. 6 is a flow chart of the method for programming remote registers using a RRAP control in a batch mode configuration.

FIG. 6 is a flow chart of the method 300 for programming remote registers using a RRAP control in a batch mode configuration. Like numbered items are as discussed with respect to FIG. 3. In this mode, the RRAP controller sets up all the remote access writes that are needed in the register bank of the SSIC protocol adaptor and then triggers the start of the remote access process. The commands remain in the register bank until the controller is reset, or system software or firmware modifies them. The RRAP controller then sets the cmd_valid flag to false (0), the cmd_phase_done flag to true (1), the HS_Config flag to false (0), and the Register Bank Valid flag to true (1). The programming procedure is then triggered. The process flow then follows the path shown as dotted line 602 in FIG. 6.

In this mode, the SSIC protocol adaptor automatically executes all the commands in the register bank each time the Link is configured or reconfigured following a link reset. Accordingly, the RRAP controller does not need to be involved in subsequent link configuration processes if the link is reset after initial system boot. Further, the SSIC protocol save/restore logic to save the contents of the register bank in system memory allows the entire host controller to be powered off in idle states without losing the contents of the Register bank. In most "always on, always connected" platforms the register memory, e.g., in the SSIC protocol adaptor, typically retains state. Thus, the link configuration may be performed after the controller is powered back on at any time without requiring the RRAP controller to get involved. Variations of the automatic procedure may be used to program the high speed controller without the intervention of the RRAP controller.

Figure 7:
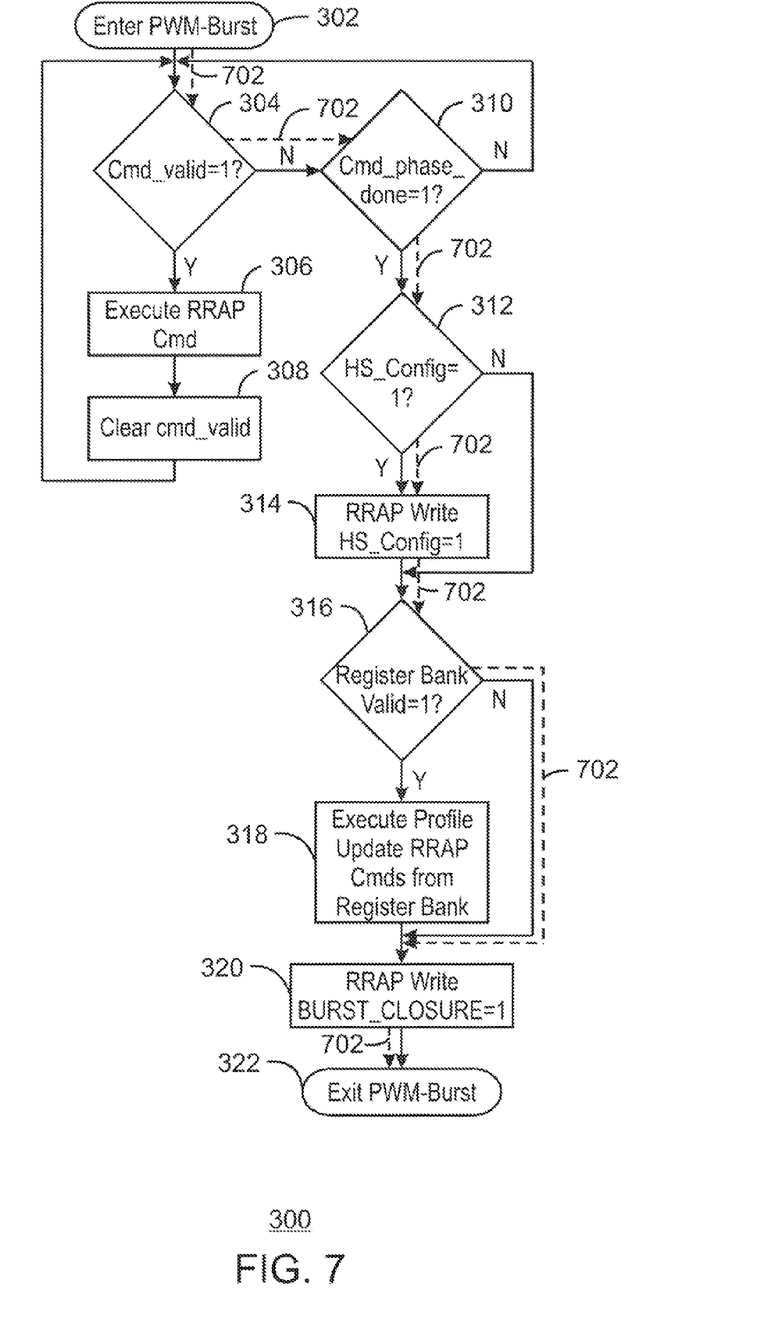
FIG. 7 is a flow chart of the method for programming remote registers using a RRAP control in a fully automated mode.

FIG. 7 is a flow chart of the method 300 for programming remote registers using a RRAP control in a fully automated mode. For example, if no profile registers (either local or remote) and no remote registers need to be updated, the host controller can be configured to automatically perform the configuration programming for HS and Burst Closure RRAP commands. In this case, the RRAP controller sets the cmd_valid flag to false (0), the cmd_phase_done flag to true (1), the HS_Config flag to true (1), and the register bank valid flag to false (0). Once the flags are set, the programming may be initiated. The process flow follows line 702 in FIG. 7.

The SSIC protocol adaptor sees cmd_valid is false, and then inspects the cmd_phase_done flag. The cmd_phase_done flag is true, triggering an inspection of the HS_Config, which is also true. As a result, at block 314, the SSIC protocol adaptor issues a high speed configuration command. Since the Register bank valid is false, the SSIC protocol adaptor treats this as the end of the PWM burst communications and, at block 320, issues the RRAP command to set Burst Closure. This is followed by exiting the PWM burst communications mode.

Figure 8:
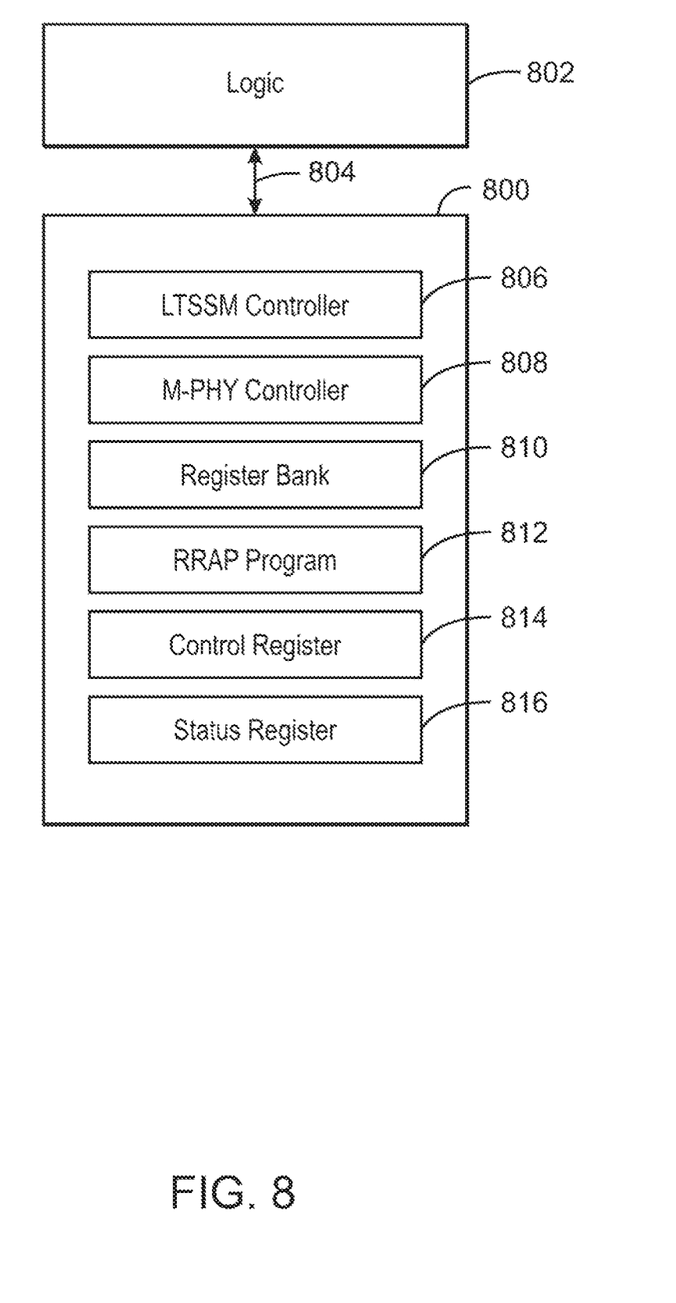
FIG. 8 is a non-transitory machine readable medium 800 that holds data and programs for implementing SSIC communications in accordance with embodiments.

FIG. 8 is a non-transitory machine readable medium 800 that holds data and programs for implementing SSIC communications in accordance with embodiments. The non-transitory machine readable medium 800 may be a RAM or ROM holding programs, or a hard-wired logic module, on the SSIC protocol adaptor 308. The non-transitory machine readable medium 800 may be accessed by logic 802, for example, the PA link SM 322 as discussed with respect to FIG. 3. The non-transitory machine readable medium 800 may provide modules, such as hardwired circuits or programs, that when executed by the logic 802 over a control link 804, perform control functions for the SSIC protocol adaptor. An LTSSM controller 806 can be included to provide the commands that are expected by the MAC during a normal USB 3.0 communications session. An M-PHY controller 808 can be provided to provide the control signals that are expected by the M-PHY during a communications session. A register bank 810 may be included to hold a sequence of RRAP commands, as described above. A RRAP program 812 may be included to implement the method 300 described with respect to FIGS. 3-7. A control register 814 can be used to hold flags that direct the execution of the RRAP program 812. A status register 816 can be used to report the results of transactions, such as RRAP reads and writes.

Other functions, not shown, can be included to implement communications in an SSIC communications. For example, a deskewer may be included to deskew multi-lane data. A scrambler/descrambler may be included to scramble and descramble packet streams to balance energy on interconnecting wires. In some embodiments, an elastic buffer may be included to replace elastic buffers in connected M-PHY units. A striper/destriper may be included to pull strip outgoing data onto multiple lanes for transmission, and to pull received data from multiple lanes and concatenate the data into single data stream.

EXAMPLE 1

A method for implementing SuperSpeed inter-chip communications (SSIC) between units in a device is disclosed herein. The method includes determining if a valid remote register access protocol (RRAP) command is present. The method also includes determining if a command phase is completed, determining if a high speed configuration command is ordered, and determining if a register bank comprises valid RRAP commands. Further, the method includes issuing a command to close a low speed burst communications between a host and a device.

The method may include executing the valid RRAP command, determining if another valid command is present, and iterating until no further valid commands are present. The method may include issuing a command to configure a high speed link.

The method may include executing an RRAP command from the register bank, pointing to the next location in the register bank, determining if the next location has a valid RRAP command, and iterating until no valid RRAP command exists in the next location or the next location is beyond the end of the register bank. The method may include exiting the low speed burst communications.

The method may include determining that no valid RRAP commands are present, determining that the command phase is completed, executing a high speed configuration command, and determining that the register bank is not valid. The method may include executing manual RRAP commands including executing an RRAP command from an RRAP controller, determining if another RRAP command has been issued from the RRAP controller, and iterating until no further commands are available from the RRAP controller. The method can also include determining that the command phase is completed, and executing a sequence of RRAP commands from the register bank, including executing an RRAP command from the register bank, pointing to the next location in the register bank, determining if the next location has a valid RRAP command, and iterating until no valid RRAP command exists in the next location or the next location is beyond the end of the register bank.

EXAMPLE 2

An interface for low power, high bandwidth communications between units in a device including a universal serial bus (USB) 3.0 system interface and a SuperSpeed inter-chip (SSIC) protocol adaptor configured to facilitate communications between the USB 3.0 system interface and an M-PHY interface. The SSIC is configured to issue remote register access protocol (RRAP) commands through a local M-PHY to a remote M-PHY in a low speed burst mode.

The SSIC protocol adaptor may be configured to store a series of RRAP commands in a register bank and autonomously execute the series of RRAP commands bank of commands upon link initiation. Further, the SSIC protocol adaptor may be configured to issue a high speed configuration command. The SSIC protocol adaptor may include a control register, wherein the control register comprises flags that include a flag that indicates the presence of a valid RRAP command, a flag that indicates a high speed configuration command should be issued, and a flag that indicates a register bank comprises a valid RRAP command. The SSIC protocol adaptor may be configured to initiate high speed communications after all commands are completed. The SSIC protocol adaptor may include a protocol adaptor link state machine configured to initiate an SSIC link. The interface may include a USB SuperSpeed Media Access Controller (MAC) and an M-PHY.

EXAMPLE 3

At least one non-transitory machine readable medium is disclosed herein that includes instructions stored therein that, in response to being executed on a computing device, cause the computing device to send RRAP commands from a register bank to an M-PHY, report transaction status in a status register, and determine actions to perform by examining a control register.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An interface for low power, high bandwidth communications between units in a device, comprising:
    a universal serial bus (USB) 3.0 system interface; and
    a SuperSpeed inter-chip (SSIC) protocol adaptor configured to facilitate communications between the USB 3.0 system interface and an M-PHY interface, wherein the SSIC is configured to issue remote register access protocol (RRAP) commands through a local M-PHY to a remote M-PHY in a low speed burst mode.

2. The interface of claim 1, wherein the SSIC protocol adaptor is configured to:
    store a series of RRAP commands in a register bank; and
    autonomously execute the series of RRAP commands bank of commands upon link initiation.

3. The interface of claim 1, wherein the SSIC protocol adaptor is configured to issue a high speed configuration command.

4. The interface of claim 1, wherein the SSIC protocol adaptor comprises a control register, wherein the control register comprises flags comprising:
    a flag that indicates the presence of a valid RRAP command;
    a flag that indicates a high speed configuration command should be issued; and
    a flag that indicates a register bank comprises a valid RRAP command.

5. The interface of claim 1, wherein the SSIC protocol adaptor is configured to initiate high speed communications after all commands are completed.

6. The interface of claim 1, wherein the SSIC protocol adaptor comprises a protocol adaptor link state machine configured to initiate an SSIC link.

7. The interface of claim 1, comprising a USB SuperSpeed Media Access Controller (MAC) and an M-PHY.

* * * * *